No. 673,960. Patented May 14, 1901.
O. R. LOOKER.
FOUNTAIN ROLLER, MOISTENER, AND SEALER.
(Application filed Dec. 7, 1900.)
(No Model.)

WITNESSES.
O. B. Ranziger
L. Edna Joslin

INVENTOR.
Oscar R. Looker,
By R. B. W. Hudson
Attorneys.

THE NORRIS PETERS CO., PHOTO-LITHO., WASHINGTON, D. C.

United States Patent Office.

OSCAR REAM LOOKER, OF DETROIT, MICHIGAN.

FOUNTAIN-ROLLER, MOISTENER, AND SEALER.

SPECIFICATION forming part of Letters Patent No. 673,960, dated May 14, 1901.

Application filed December 7, 1900. Serial No. 38,989. (No model.)

*To all whom it may concern:*

Be it known that I, OSCAR REAM LOOKER, a citizen of the United States, residing at Detroit, in the county of Wayne and State of Michigan, have invented certain new and useful Improvements in Fountain-Rollers, Moisteners, and Sealers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a fountain-roller, moistener, and sealer; and it consists in the construction and arrangement of parts, as hereinafter fully set forth, and pointed out more particularly in the claims.

The object of the invention is to produce an article of the character described in which the arrangement is such as to provide a constant supply of moisture to the roller-pad in such quantity as to keep the pad evenly moist, so that it may serve to moisten gummed surfaces and to seal envelops and like articles.

The above object is attained by the device illustrated in the accompanying drawings, in which—

Figure 1:
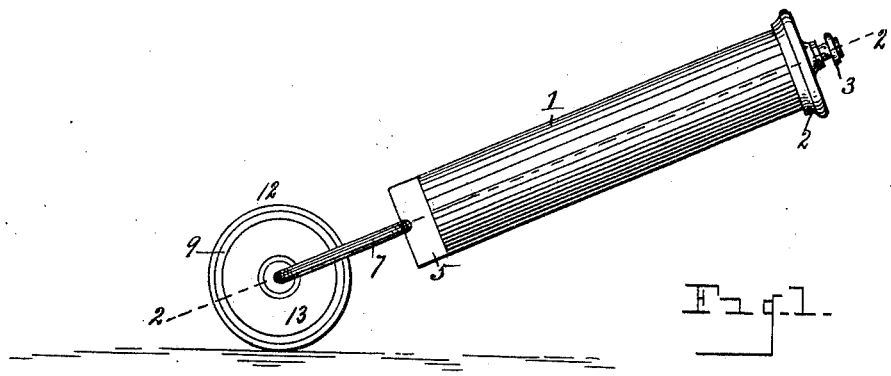
Figure 2:
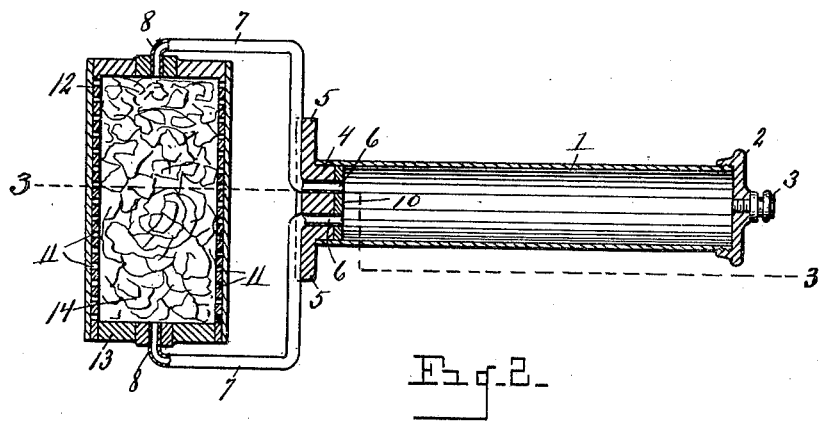
Figure 3:
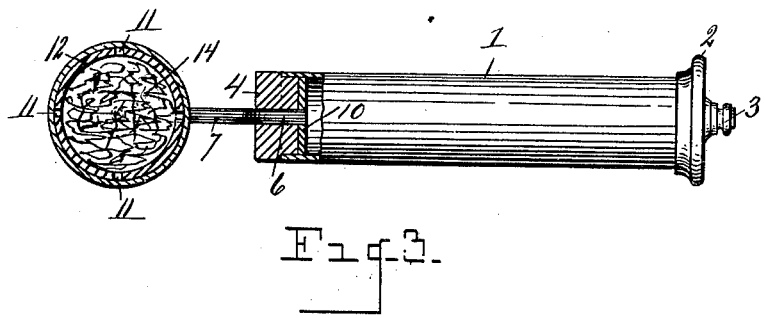

Figure 1 is an elevation of my improved device. Fig. 2 is a longitudinal horizontal section as on line 2 2 of Fig. 1. Fig. 3 is a transverse section through the roller and through a portion of the handle as on line 3 3 of Fig. 2.

Referring to the characters of reference, 1 designates a hollow cylindrical handle of any suitable construction having its upper end closed by a removable screw-cap 2, provided with a vent-plug 3. The lower end of said handle is closed by a plug 4, having the lateral projections 5. Passing through the plug 4 are the end portions 6 of the hollow bracket-arms 7, which comprise a yoke or bail supported by the lateral projections on said plug and whose opposite outer ends are provided with right-angled portions 8, journaled in the opposite ends of a roller 9, the end portions 6 of the hollow bracket-arms communicating with the interior of the handle 1 and the opposite ends 8 of said arms communicating with the interior of the roller 9, thereby establishing communication between the handle and the roller. Seated upon the plug 4 within the lower end of the handle is a washer 10, which makes a closure around the ends of the hollow bracket-arms, which enter said handle and prevent the water adapted to be contained in the handle from leaking out around said arms.

The roller 9 is provided with rows of apertures through the periphery thereof, and embracing said roller is an annular pad 12, of felt or other suitable absorbent material. One end 13 of the roller is removable to allow of the placing of a sponge 14 or other analogous substance within said roller.

It is designed that the hollow handle 1 shall be filled with water by removing the cap 2. After the handle is filled the cap is screwed into place, thereby hermetically sealing the upper end of said handle. The water contained in the handle will flow downward through the bracket-arm 7 into the roller, where it is absorbed by the sponge 14, which becomes saturated and which gives off its moisture through the apertures 11 in the periphery of the roller, whereby the peripheral pad is made sufficiently damp to enable it to be used for moistening gummed surfaces, as in sealing envelops or attaching stamps.

In sealing envelops with this improved device the dampened roller is rolled over the gummed surface, when the fly is folded onto the envelop and may be pressed into contact therewith by passing a roller over its outer marginal face. In attaching stamps either the gummed face of the stamp or the surface of the envelop may be moistened by the roller and the stamp secured in place by passing the roller over its surface, whereby it is caused to perfectly adhere. To insure a proper flow of water from the handle into the sponge of the roller, the vent-plug 3 may be wholly or partially withdrawn from the cap 2 to relieve any vacuum in the handle induced by the absorption of the water in the sponge and its consumption in the use of the device.

The supply of water contained in the handle is sufficient to last for many days with constant use and insures at all times the presence of a requisite amount of moisture in the pad 12.

Having thus fully set forth my invention, what I claim as new, and desire to secure by Letters Patent, is—

1. The combination with a hollow roller having a series of apertures through the wall thereof and a hollow journal projecting from its end, of an annular pad embracing the periphery of said roller, a hollow handle adapted to contain water, an angular hollow bracket arm and tube attached to and communicating with the hollow journal of the roller, said arm or tube communicating with the interior of the handle and serving to connect the handle with the roller.

2. The combination with a hollow roller, having apertures through the wall thereof, of an absorbent filling the interior of said roller, a pad upon the surface of the roller covering said apertures, a hollow handle adapted to contain water, angular tubes mounted in the end of the handle and communicating with the interior thereof the angular end of said tubes entering through the opposite ends of the roller forming hollow journals therefor and serving as a connection between the handle and roller which affords a passage-way for the water to the roller from the handle.

In testimony whereof I sign this specification in the presence of two witnesses.

OSCAR REAM LOOKER.

Witnesses:
JOHN C. GRIX,
J. S. MURRAY.